United States Patent
Dyne et al.

(10) Patent No.: US 12,321,950 B2
(45) Date of Patent: Jun. 3, 2025

(54) PRODUCT AUTHENTICATION SYSTEMS, METHODS, AND DEVICES

(71) Applicant: Stegvision Corp., Woodland Hills, CA (US)

(72) Inventors: Larry Elan Dyne, Calabasas, CA (US); Daniel Tek-Jong Ryu, Yorba Linda, CA (US)

(73) Assignee: Stegvision Corp., Woodland Hills, CA (US)

( * ) Notice: Subject to any disclaimer, the term of this patent is extended or adjusted under 35 U.S.C. 154(b) by 406 days.

(21) Appl. No.: 17/601,072

(22) PCT Filed: Mar. 16, 2020

(86) PCT No.: PCT/IB2020/052384
§ 371 (c)(1),
(2) Date: Oct. 3, 2021

(87) PCT Pub. No.: WO2020/212771
PCT Pub. Date: Oct. 22, 2020

(65) Prior Publication Data
US 2022/0164806 A1    May 26, 2022

Related U.S. Application Data

(60) Provisional application No. 62/834,875, filed on Apr. 16, 2019.

(51) Int. Cl.
G06Q 30/018    (2023.01)
G06T 1/00    (2006.01)
G06V 20/00    (2022.01)

(52) U.S. Cl.
CPC ....... *G06Q 30/018* (2013.01); *G06Q 30/0185* (2013.01); *G06T 1/0021* (2013.01);
(Continued)

(58) Field of Classification Search
CPC .............. G06Q 30/018; G06Q 30/0185; G06T 1/0021; G06T 2201/0051; G06V 20/00;
(Continued)

(56) References Cited

U.S. PATENT DOCUMENTS 7,174,031 B2    2/2007 Rhoads et al.
7,315,629 B2    1/2008 Alasia et al.
(Continued)

FOREIGN PATENT DOCUMENTS

EP    1923830 A2    5/2008
KR    100459922 B1    12/2004
(Continued)

OTHER PUBLICATIONS

Anti-Counterfeit Authenticity Labels—Smart Chips With Electronic Ink & Wireless I/O—Duplicate Serial Number Detection IP.com No. IPCOM000034366D IP.com Electronic Publication Date: Jan. 19, 2005 (Year: 2005).*
(Continued)

*Primary Examiner* — Alexandru Cirnu
(74) *Attorney, Agent, or Firm* — SIRITZKY LAW, PLLC

(57) ABSTRACT

A method includes providing an image; analyzing the image to determine one or more encodable areas; determining a plurality of distinct serial numbers; adding the plurality of distinct serial numbers to a database; and producing a first plurality of first tags based on the image, each of the first tags including encoded information in at least one encodable area thereon, the encoded information for each particular first tag including a corresponding particular unique serial number of the distinct serial numbers, wherein at least some of the encoded information is encoded using steganography. Information in the image is used to authenticate a product.

28 Claims, 6 Drawing Sheets

(52) U.S. Cl.
CPC .............. *G06V 20/00* (2022.01); *G06V 20/95* (2022.01); *G06T 2201/0051* (2013.01); *G06V 2201/09* (2022.01); *G06V 2201/10* (2022.01)

(58) Field of Classification Search
CPC .............. G06V 20/95; G06V 2201/09; G06V 2201/10; G07D 7/0034; G07D 7/0043
See application file for complete search history.

(56) References Cited

U.S. PATENT DOCUMENTS

| | | | |
|---|---|---|---|
| 8,447,067 | B2 | 5/2013 | Rhoads et al. |
| 8,457,449 | B2 | 6/2013 | Rhoads et al. |
| 8,538,064 | B2 | 9/2013 | Rhoads et al. |
| 8,807,425 | B2 | 8/2014 | Saywa et al. |
| 9,582,595 | B2 | 2/2017 | Trifa et al. |
| 9,794,321 | B2 | 10/2017 | Trifa et al. |
| 10,201,939 | B1 | 2/2019 | Pare et al. |
| 10,565,490 | B2 | 2/2020 | McDonald et al. |
| 10,972,281 | B2 | 4/2021 | Scott et al. |
| 11,068,761 | B2 | 7/2021 | Guinard et al. |
| 2002/0012445 | A1* | 1/2002 | Perry ................. H04N 21/4223 382/100 |
| 2002/0118394 | A1* | 8/2002 | Mckinley ........... G06Q 30/0236 358/3.28 |
| 2002/0146146 | A1* | 10/2002 | Miolla .................. G06T 1/0042 382/100 |
| 2003/0031341 | A1* | 2/2003 | Rhoads ............ G11B 20/00166 707/E17.112 |
| 2007/0095928 | A1* | 5/2007 | Balinsky ............... G07F 7/0833 235/382 |
| 2007/0100761 | A1 | 5/2007 | Dillon |
| 2007/0185788 | A1 | 8/2007 | Dillon |
| 2008/0002882 | A1* | 1/2008 | Voloshynovskyy ... G07D 7/005 380/201 |
| 2010/0045816 | A1 | 2/2010 | Rhoads |
| 2010/0284564 | A1* | 11/2010 | Brundage .............. G07D 7/004 382/100 |
| 2012/0298743 | A1* | 11/2012 | Voloshynovskyy ... G07D 7/005 235/375 |
| 2015/0089605 | A1 | 3/2015 | Trifa et al. |
| 2015/0227947 | A1 | 8/2015 | Ching |
| 2016/0314475 | A1 | 10/2016 | Nudel et al. |
| 2019/0050554 | A1* | 2/2019 | Fiske ..................... H04L 63/08 |
| 2019/0190739 | A1 | 6/2019 | Guinard et al. |
| 2020/0151738 | A1 | 5/2020 | Guinard et al. |
| 2021/0142337 | A1 | 5/2021 | Guinard et al. |
| 2021/0256110 | A1 | 8/2021 | Guinard et al. |
| 2021/0258144 | A1 | 8/2021 | Minier |

FOREIGN PATENT DOCUMENTS

| | | |
|---|---|---|
| KR | 101298224 B1 | 8/2013 |
| WO | 2000070585 A1 | 11/2000 |

OTHER PUBLICATIONS

WIPO, International Search Report, Sep. 1, 2020, for PCT/IB2020/052384 (3p.).
WIPO, Written Opinion of the International Searching Authority, Sep. 1, 2020, for PCT/IB2020/052384 (9p.).
WIPO, International Preliminary Report on Patentability, Sep. 28, 2021, for PCT/IB2020/052384 (9p.).
WIPO, International Search Report for PCT/IB2020/052384, Oct. 22, 2020 (3p.).
WIPO, Written Opinion of the International Searching Authority for PCT/IB2020/052384, Oct. 22, 2020 (9p.).

* cited by examiner

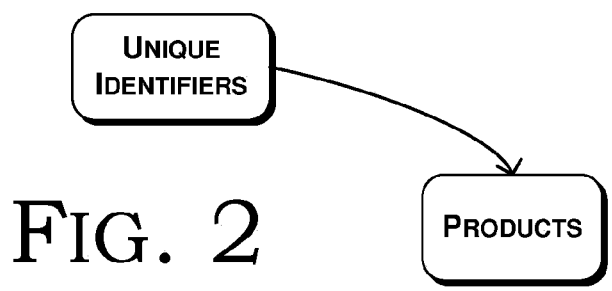
FIG. 2
FIG. 3
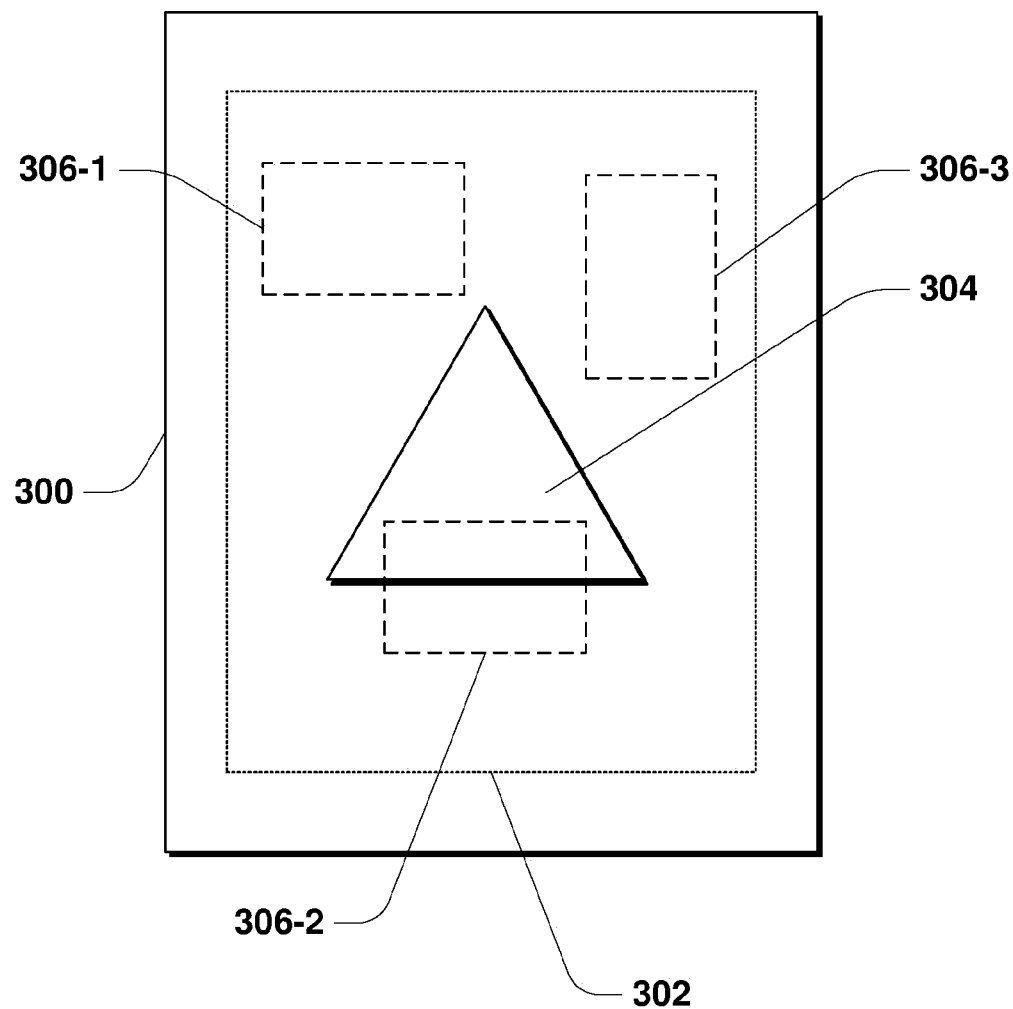

PRODUCT AUTHENTICATION SYSTEMS, METHODS, AND DEVICES

RELATED APPLICATIONS

This application is the National Stage in the U.S. (a 371) of International Application No. PCT/IB2020/052384, filed Mar. 16, 2020, published as WO/2020/212771 on Oct. 22, 2020, the entire contents of which are hereby fully incorporated herein by reference for all purposes. PCT/EP2020/057886 claims priority from U.S. Provisional Patent Application No. 62/834,875, filed Apr. 16, 2019, the entire contents of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to product tracking and authentication. More particularly, this invention relates to frameworks, systems, and methods for determination of the authenticity or origin or provenance of a product.

BACKGROUND

Counterfeiting and unauthorized manufacturing of products are major problems for product rights holders.

Counterfeit products (e.g., unauthorized knockoffs), generally of poorer quality than authorized versions of the same product, can damage a company's goodwill and brand.

Unauthorized manufacturing may occur when an authorized manufacturer over produces a product, selling the unauthorized overproduction on the so-called "grey" market. In such cases, while a buyer may obtain a product with the same quality as an authorized product, the product rights holder is deprived of the benefit of the sale of these products.

It is desirable and an object hereof to provide a way to detect counterfeit and/or unauthorized products.

It is also desirable and an object hereof to provide a chain of title or transfer of products.

It is further desirable and an object hereof to provide information about products in a non-intrusive manner.

It is still further desirable and an object hereof to support and enable verification of products by users without the users needing specialized hardware.

SUMMARY

The present invention is specified in the claims as well as in the below description. Preferred embodiments are particularly specified in the dependent claims and the description of various embodiments.

In general, without limitation, and according to exemplary embodiments hereof, the property authentication system may determine authenticity of a product from imagery associated with that product.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: providing an image; analyzing the image to determine one or more encodable areas; determining a plurality of distinct serial numbers; and adding the plurality of distinct serial numbers to a database. The method also includes producing a first plurality of first tags based on the image, each of the first tags including encoded information in at least one encodable area thereon, the encoded information for each particular first tag including a corresponding particular unique serial number of the distinct serial numbers, where at least some of the encoded information is encoded using steganography. Other embodiments of this aspect include corresponding computer systems, apparatus, and computer programs recorded on one or more computer storage devices, each configured to perform the actions of the methods.

Implementations may include one or more of the following features, alone or in combination(s):

The method where the encoded information is in more than one encodable area on the first tag; and/or The method where the image includes a product logo; and/or The method further including: providing the first plurality of first tags to a third party; and/or The method where the third party is a product manufacturer; and/or The method where at least some of the first plurality of first tags are associated with corresponding products; and/or The method where the third party associates at least some of the first plurality of first tags with corresponding products; and/or The method where each of the corresponding products has at least one first tag associated therewith; and/or The method where a first tag associated with a particular product includes a particular serial number; and/or The method further including: associating, in the database, each of the products with a corresponding serial number, where, for a given product, the corresponding serial number is associated with a first tag associated with the given product; and/or The method where the at least some of the first plurality of tags are integrated with the corresponding products; and/or The method where the at least some of the first plurality of tags are distinct from the corresponding products; and/or The method further including: producing a second plurality of second tags, each of the each of the second tags including second encoded information in at least one encodable area thereon, the encoded second information for each particular second tag including a corresponding particular unique serial number of the distinct serial numbers, where at least some of the encoded second information is encoded using steganography; and/or The method where at least some of the second plurality of second tags are associated with corresponding products; and/or The method where a second tag associated with a particular product includes a second particular serial number; and/or The method further including: associating, in the database, each of the products with a corresponding second serial number, where, for a given product, the corresponding second serial number is associated with a second tag associated with the given product; and/or The method where, for a certain product, the certain product having a certain first tag and a certain second tag associated therewith, the serial number associated with the certain second tag is the same as the serial number associated with the certain first tag; and/or The method where, for a certain product, the certain product having a certain first tag and a certain second tag associated therewith, the serial number associated with the certain second tag is distinct from the serial number associated with the certain first tag; and/or The method where the first plurality of first tags are distinct from the second plurality of second tags; and/or The method where a first tag associated with a particular product includes a particular serial number; and/or The method further including: causing each of the products to be associated, in a database, with a corresponding serial number, where, for a given product, the corresponding serial number is associated with a first tag associated with the given product; and/or The method further including: obtaining a second plurality of second tags, each of the each of the second tags including second encoded information in at least one encodable area thereon, the encoded second information for each particular second tag including a corresponding particular unique serial number of the plurality of distinct serial numbers, where at least some of the encoded second information is encoded using steganography. The method may also include associating at least some of the second plurality of first tags with corresponding products; and/or The method where, for a certain product, the certain product having a certain first tag and a certain second tag associated therewith, the serial number associated with the certain second tag is the same as the serial number associated with the certain first tag; and/or The method where the first plurality of first tags are distinct from the second plurality of second tags; and/or The method where, for a certain product, the certain product having a certain first tag and a certain second tag associated therewith, the serial number associated with the certain second tag is distinct from the serial number associated with the certain first tag; and/or The method where the second plurality of second tags include one or more substrates, each substrate selected from a group including: paper, cardboard, leather, plastic, metal, and fabric; and/or The method where the second plurality of second tags include one or more substrates, each substrate selected from a group including: paper, cardboard, leather, plastic, metal, and fabric; and/or The method where the image has an arbitrary shape; and/or The method where the first plurality of first tags include one or more substrates, each substrate selected from a group including: paper, cardboard, leather, plastic, metal, and fabric; and/or The method where the producing includes printing.

Another general aspect includes a method including: obtaining a first plurality of first tags, each of the first tags including encoded information in at least one encodable area thereon, the encoded information for each particular first tag including a corresponding particular unique serial number of a plurality of distinct serial numbers, where at least some of the encoded information is encoded using steganography, and where the plurality of distinct serial numbers were previously added to a database. The method also includes associating at least some of the first plurality of first tags with corresponding products. Other embodiments of this aspect include corresponding computer systems, apparatus, and computer programs recorded on one or more computer storage devices, each configured to perform the actions of the methods.

Implementations may include one or more of the following features, alone or in combination(s):

The method where each of the corresponding products has at least one first tag associated therewith; and/or The method where the at least some of the first plurality of tags are integrated with the corresponding products; and/or The method where the at least some of the first plurality of tags are distinct from the corresponding products; and/or The method where the first plurality of first tags include one or more substrates, each substrate selected from a group including: paper, cardboard, leather, plastic, metal, and fabric; and/or The method where the at least some of the first plurality of tags are integrated with the corresponding products.

Yet another general aspect includes a method including obtaining an image of a tag associated with a product, where the tag includes encoded information in at least one encodable area thereon, the encoded information including a unique serial number, where at least some of the encoded information is encoded using steganography and sending the image to an authentication service. The method also includes in response to one or more requests from the authentication service, providing additional information to the authentication service. The method also includes obtaining from the authentication service an indication of authenticity of the product.

Other embodiments of this aspect include corresponding computer systems, apparatus, and computer programs recorded on one or more computer storage devices, each configured to perform the actions of the methods.

Implementations may include one or more of the following features, alone or in combination(s):

The method where the additional information includes one or more of: (a) another image of the tag; (b) a second image of a second tag associated with the product; (c) an image of the product or one or more portions of the product; (d) a description of the product or one or more portions of the product; and (e) location information; and/or The method where the indication of authenticity is based on information in the image and at least some of the additional information; and/or The method where the indication of authenticity is based on a unique serial number encoded in the image and at least some of the additional information; and/or The method where the indication of authenticity is based on whether the unique serial number is associated with the product in a database; and/or The method where the second tag has a unique serial number encoded therein, and where the indication of authenticity is based on the unique serial number encoded in the image and at least the unique serial number encoded in the second tag; and/or The method where the serial number on the second tag is distinct from the serial number on the tag; and/or The method further including registering new ownership of the product; and/or The method where the second tag is integrated with the product; and/or The method where the tag is distinct from the product; and/or The method where the second tag includes one or more substrates, each substrate selected from a group including: paper, cardboard, leather, plastic, metal, and fabric; and/or The method where the encoded information is in more than one encodable area on the tag; and/or The method where the image includes a product logo; and/or The method where the image has an arbitrary shape; and/or The method where the tag is integrated with the product; and/or The method where the tag is distinct from the product; and/or The method where the tag includes one or more substrates, each substrate selected from a group including: paper, cardboard, leather, plastic, metal, and fabric.

Yet another general aspect includes a method including: (a) receiving an image, the image including encoded information in at least one encodable area thereon, where at least some of the encoded information was encoded using steganography. The method also includes (b) determining a first identifier from the encoded information. The method also includes (c) determining whether the first identifier corresponds to an identifier in a database including a plurality of identifiers. The method also includes (d) based on the determining in (c), when it is determined that the first identifier corresponds to a particular identifier of the plurality of identifiers, the particular identifier being associated with a particular product in the database, (d)(1) determining, from the database, product information associated with the particular product; (d)(2) requesting additional information, and (d)(3) based on the additional information, providing an indication of authenticity of the product.

Other embodiments of this aspect include corresponding computer systems, apparatus, and computer programs recorded on one or more computer storage devices, each configured to perform the actions of the methods.

Implementations may include one or more of the following features, alone or in combination(s):

The method where the image was acquired from a tag associated with a first product; and/or The method where the additional information includes one or more of: (a) another image of the tag; (b) a second image of a second tag associated with the product; (c) an image of the product or one or more portions of the product; (d) a description of the product or one or more portions of the product; and (e) location information; and/or The method where the second tag is integrated with the product; and/or The method where the second tag includes one or more substrates, each substrate selected from a group including: paper, cardboard, leather, plastic, metal, and fabric; and/or The method where the tag is integrated with the product; and/or The method where the tag is distinct from the product; and/or The method where the tag includes one or more substrates, each substrate selected from a group including: paper, cardboard, leather, plastic, metal, and fabric; and/or The method where the indication of authenticity is based on a unique serial number encoded in the image and at least some of the additional information; and/or The method where the indication of authenticity is based on whether the unique serial number is associated with the product in the database; and/or The method where the encoded information is in more than one encodable area in the image; and/or The method where the image includes a product logo; and/or The method where the image has an arbitrary shape; and/or The method where the image was received in (a) from a user; and/or The method further including: (e) registering the product with the user.

Implementations of the described techniques may include hardware, a method or process, or computer software on a computer-accessible medium.

Below is a list of method or process embodiments. Those will be indicated with a letter "P."

P1. A method comprising:
providing an image;
analyzing said image to determine one or more encodable areas;
determining a plurality of distinct serial numbers;
adding said plurality of distinct serial numbers to a database; and
producing a first plurality of first tags based on said image, each of said first tags including encoded information in at least one encodable area thereon, said encoded information for each particular first tag including a corresponding particular unique serial number of said distinct serial numbers, wherein at least some of said encoded information is encoded using steganography.

P2. The method of aspect P1, wherein the encoded information is in more than one encodable area on said first tag.

P3. The method of embodiments P1 or P2, wherein the image comprises a product logo.

P4. The method of any of the preceding aspects, further comprising: providing the first plurality of first tags to a third party.

P5. The method of embodiment(s) P4, wherein the third party is a product manufacturer.

P6. The method of any of the preceding aspects, wherein at least some of the first plurality of first tags are associated with corresponding products.

P7. The method of any of the preceding aspects P4-P6, wherein the third party associates at least some of the first plurality of first tags with corresponding products.

P8. The method of any of the preceding aspects P4-P7, wherein each of the corresponding products has at least one first tag associated therewith.

P9. The method of any of the preceding aspects P4-P8, wherein a first tag associated with a particular product includes a particular serial number, the method further comprising: associating, in said database, each of said products with a corresponding serial number, wherein, for a given product, said corresponding serial number is associated with a first tag associated with the given product.

P10. The method of any of the preceding aspects P4-P9, further comprising: producing a second plurality of second tags, each of said each of said second tags including second encoded information in at least one encodable area thereon, said encoded second information for each particular second tag including a corresponding particular unique serial number of said distinct serial numbers, wherein at least some of said encoded second information is encoded using steganography.

P11. The method of embodiment(s) P10, wherein at least some of the second plurality of second tags are associated with corresponding products.

P12. The method of embodiments P10 or P11, wherein a second tag associated with a particular product includes a second particular serial number, the method further comprising: associating, in said database, each of said products with a corresponding second serial number, wherein, for a given product, said corresponding second serial number is associated with a second tag associated with the given product.

P13. The method of any of the preceding aspects P10-P12, wherein, for a certain product, said certain product having a certain first tag and a certain second tag associated therewith, the serial number associated with the certain second tag is the same as the serial number associated with the certain first tag.

P14. The method of any of the preceding aspects P10-P12, wherein, for a certain product, said certain product having a certain first tag and a certain second tag associated therewith, the serial number associated with the certain second tag is distinct from the serial number associated with the certain first tag.

P15. The method of any of the preceding aspects, wherein the image has an arbitrary shape.

P16. The method of any of the preceding aspects, wherein the at least some of the first plurality of tags are integrated with the corresponding products.

P17. The method of any of the preceding aspects, wherein the at least some of the first plurality of tags are distinct from the corresponding products.

P18. The method of any of the preceding aspects, wherein the first plurality of first tags comprise one or more substrates, each substrate selected from a group comprising: paper, cardboard, leather, plastic, metal, and fabric.

P19. The method of any of the preceding aspects, wherein the producing comprises printing.

P20. The method of any of the preceding aspects P10-P19, wherein the first plurality of first tags are distinct from the second plurality of second tags.

P21. The method of embodiment(s) P10-P20, wherein the second plurality of second tags comprise one or more substrates, each substrate selected from a group comprising: paper, cardboard, leather, plastic, metal, and fabric.

P22. A method comprising:
obtaining a first plurality of first tags, each of said first tags including encoded information in at least one encodable area thereon, said encoded information for each particular first tag including a corresponding particular unique serial number of a plurality of distinct serial numbers, wherein at least some of said encoded information is encoded using steganography, and wherein said plurality of distinct serial numbers were previously added to a database; and
associating at least some of the first plurality of first tags with corresponding products.

P23. The method of embodiment(s) P22, wherein each of the corresponding products has at least one first tag associated therewith.

P24. The method of embodiments P22 or P23, wherein a first tag associated with a particular product includes a particular serial number, the method further comprising: causing each of said products to be associated, in a database, with a corresponding serial number, wherein, for a given product, said corresponding serial number is associated with a first tag associated with the given product.

P25. The method of any of the preceding aspects P20-P24, further comprising:
obtaining a second plurality of second tags, each of said each of said second tags including second encoded information in at least one encodable area thereon, said encoded second information for each particular second tag including a corresponding particular unique serial number of said plurality of distinct serial numbers, wherein at least some of said encoded second information is encoded using steganography; and
associating at least some of the second plurality of first tags with corresponding products.

P26. The method of embodiment(s) P25, wherein, for a certain product, said certain product having a certain first tag and a certain second tag associated therewith, the serial number associated with the certain second tag is the same as the serial number associated with the certain first tag.

P27. The method of embodiment(s) P25, wherein, for a certain product, said certain product having a certain first tag and a certain second tag associated therewith, the serial number associated with the certain second tag is distinct from the serial number associated with the certain first tag.

P28. The method of any of the preceding aspects P22 to P27, wherein the at least some of the first plurality of tags are integrated with the corresponding products.

P29. The method of any of the preceding aspects P22 to P28, wherein the at least some of the first plurality of tags are distinct from the corresponding products.

P30. The method of any of the preceding aspects P22 to P29, wherein the first plurality of first tags comprise one or more substrates, each substrate selected from a group comprising: paper, cardboard, leather, plastic, metal, and fabric.

P31. The method of any of the preceding aspects P22 to P30, wherein the first plurality of first tags are distinct from the second plurality of second tags.

P32. The method of any of the preceding aspects P22 to P31, wherein the at least some of the first plurality of tags are integrated with the corresponding products.

P33. The method of any of the preceding aspects P25 to P32, wherein the second plurality of second tags comprise one or more substrates, each substrate selected from a group comprising: paper, cardboard, leather, plastic, metal, and fabric.

P34. A method comprising:
obtaining an image of a tag associated with a product, wherein said tag includes encoded information in at least one encodable area thereon, said encoded information including a unique serial number, wherein at least some of said encoded information is encoded using steganography;
sending the image to an authentication service;
in response to one or more requests from said authentication service, providing additional information to said authentication service; and
obtaining from said authentication service an indication of authenticity of said product.

P35. The method of embodiment(s) P34, wherein the additional information comprises one or more of:
(a) another image of said tag;
(b) a second image of a second tag associated with the product;
(c) an image of the product or one or more portions of the product;
(d) a description of the product or one or more portions of the product; and
(e) location information.

P36. The method of embodiments P34 or P35, wherein said indication of authenticity is based on information in said image and at least some of said additional information.

P37. The method of any of the preceding aspects P34 to P36, wherein said indication of authenticity is based on a unique serial number encoded in said image and at least some of said additional information.

P38. The method of any of the preceding aspects P34 to P37, wherein said indication of authenticity is based on whether said unique serial number is associated with said product in a database.

P39. The method of any of the preceding aspects P34 to P38, wherein said second tag has a unique serial number encoded therein, and wherein said indication of authenticity is based on the unique serial number encoded in said image and at least the unique serial number encoded in the second tag.

P40. The method of embodiment(s) P39, wherein the serial number on the second tag is distinct from the serial number on the tag.

P41. The method of any of the preceding aspects P34 to P40, further comprising registering new ownership of the product.

P42. The method of any of the preceding aspects P34 to P41, wherein the encoded information is in more than one encodable area on said tag.

P43. The method of any of the preceding aspects P34 to P42, wherein the image comprises a product logo.

P44. The method of any of the preceding aspects P34 to P43, wherein the image has an arbitrary shape.

P45. The method of any of the preceding aspects P34 to P44, wherein the tag is integrated with the product.

P46. The method of any of the preceding aspects P34 to P45, wherein the tag is distinct from the product.

P47. The method of any of the preceding aspects P34 to P46, wherein the second tag is integrated with the product.

P48. The method of any of the preceding aspects P34 to P47, wherein the tag is distinct from the product.

P49. The method of embodiment(s) P34, wherein the tag comprises one or more substrates, each substrate selected from a group comprising: paper, cardboard, leather, plastic, metal, and fabric.

P50. The method of embodiment(s) P35, wherein the second tag comprises one or more substrates, each substrate selected from a group comprising: paper, cardboard, leather, plastic, metal, and fabric.

P51. A method comprising:
(A) receiving an image, said image including encoded information in at least one encodable area thereon, wherein at least some of said encoded information was encoded using steganography;
(B) determining a first identifier from said encoded information;
(C) determining whether said first identifier corresponds to an identifier in a database comprising a plurality of identifiers; and
(D) based on said determining in (C), when it is determined that said first identifier corresponds to a particular identifier of said plurality of identifiers, said particular identifier being associated with a particular product in said database,
(D)(1) determining, from said database, product information associated with said particular product;
(D)(2) requesting additional information, and
(D)(3) based on said additional information, providing an indication of authenticity of said product.

P52. The method of embodiment(s) P51, wherein the image was acquired from a tag associated with a first product.

P53. The method of embodiment(s) P52, wherein the additional information comprises one or more of:
(a) another image of said tag;
(b) a second image of a second tag associated with the first product;
(c) an image of the first product or one or more portions of the first product;
(d) a description of the first product or one or more portions of the first product; and
(e) location information.

P54. The method of embodiment(s) P51, wherein said indication of authenticity is based on a unique serial number encoded in said image and at least some of said additional information.

P55. The method of embodiment(s) P54, wherein said indication of authenticity is based on whether said unique serial number is associated with said product in said database.

P56. The method of embodiment(s) P51, wherein the encoded information is in more than one encodable area in said image.

P57. The method of embodiment(s) P51, wherein the image comprises a product logo.

P58. The method of embodiment(s) P51, wherein the image has an arbitrary shape.

P59. The method of embodiment(s) P52, wherein the tag is integrated with the product.

P60. The method of embodiment(s) P52, wherein the tag is distinct from the product.

P61. The method of embodiment(s) P53, wherein the second tag is integrated with the product.

P62. The method of embodiment(s) P52, wherein the tag comprises one or more substrates, each substrate selected from a group comprising: paper, cardboard, leather, plastic, metal, and fabric.

P63. The method of embodiment(s) P53, wherein the second tag comprises one or more substrates, each substrate selected from a group comprising: paper, cardboard, leather, plastic, metal, and fabric.

P64. The method of embodiment(s) P51, wherein said image was received in (A) from a user, the method further comprising: (E) registering said product with said user.

Below is a list of article of manufacture embodiments. Those will be indicated with a letter "A."
  A65. An article of manufacture comprising non-transitory computer-readable media having computer-readable instructions stored thereon, the computer readable instructions including instructions for implementing a computer-implemented method, said method operable on a device comprising hardware including memory and at least one processor and running a service on said hardware, said method comprising the method of any one of the preceding method aspects P1-P64.

Below is a list of device embodiments. Those will be indicated with a letter "D."
  D66. A device, comprising:
    (a) hardware including memory and at least one processor, and
    (b) a service running on said hardware, wherein said service is configured to: perform the method of any one of the preceding method aspects P1-P64.

Below is a list of system embodiments. Those will be indicated with a letter "S."
  S67. A system comprising one or more devices according to D66.

The above features along with additional details of the invention are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIG. 2 shows aspects of data structures used according to exemplary embodiments hereof;

FIG. 3 shows a tag according to exemplary embodiments hereof;

DETAILED DESCRIPTION OF THE PRESENTLY PREFERRED EXEMPLARY EMBODIMENTS

As used herein, unless used otherwise, the following terms and abbreviations have the following meanings:
  API means application programming interface;
  GUI means graphical user interface;
  UI means user interface; and
  As used herein, the term "mechanism," as used herein, refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

As used herein, the term "product" generally refers, without limitation, to any physical product.

Overview and Structure

Figure 1:
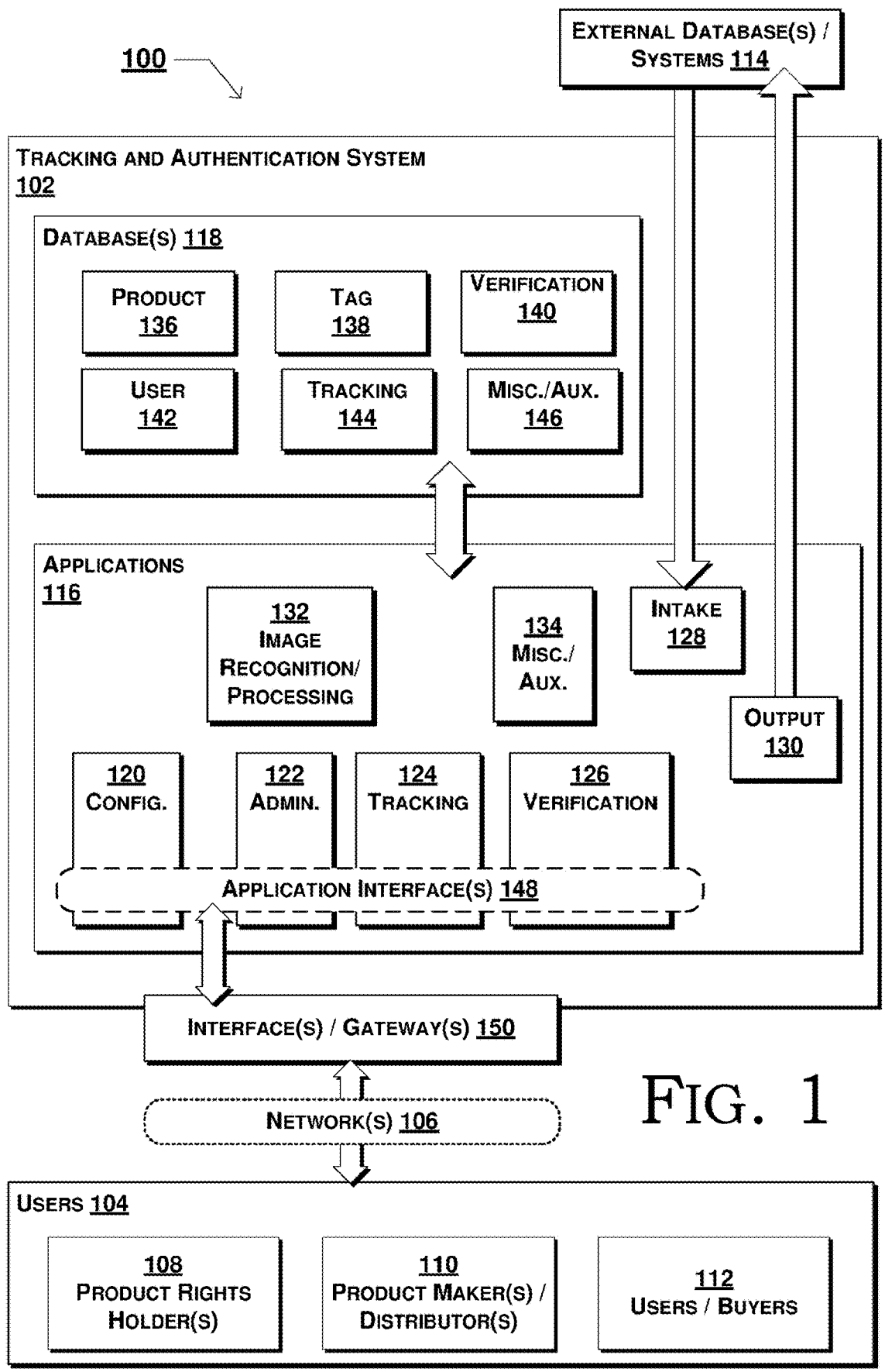
FIG. 1 shows an overview of aspects of a product authentication framework according to exemplary embodiments hereof.

FIG. 1 shows aspects of an exemplary framework/system 100 for a product tracking and authentication system 102 according to exemplary embodiments hereof. As shown in the drawing, a product authentication system 102 may be accessed by users 104, e.g., via one or more networks 106 (e.g., the Internet). For example, as shown in FIG. 1, the users 104 may include product rights holders 108, product manufacturers/distributors 110, and product users/buyers 112. This list of types of users is exemplary, and the users 104 may include different and/or other types of users.

As used herein, the term "product" is used to define anything that can be made and that can exist in a tangible form for any period of time. Non-limiting examples of products include items of clothing, shoes, food items, beverages (e.g., bottled or canned), alcoholic drinks (e.g., wine and other alcoholic beverages), vehicles (e.g., cars, bicycles, etc.), books, CDs, DVDs, computers, electronic equipment, etc. A product may be or comprise one or more component items or products. The term "product" is used to describe aspects of the system/framework 100, and the system is not constrained by the kind of product or the manner in which it is made or sold.

As used herein, a product rights holder may be, for example, and without limitation, an entity with one or more rights in or to a certain kind of product. The rights may include, without limitation, one or more of the following rights with respect to the certain kind of product: to make, use, sell, have made, export, and/or import. The rights may be legal rights provided by a legal framework (e.g., patent or copyright). The rights may be contractual. The term "rights holder" is used to describe aspects of the system/framework 100, and the system is not constrained by the type or existence of any rights a rights holder may have or the manner in which those rights were obtained.

The users 104 may have distinct roles and may be provided with role-specific access interfaces and/or mechanisms.

Each user 104 may access the product tracking and authentication system 102 using one or more computing devices, as is known in the art. The product tracking and authentication system 102 may also access and be accessible by various external systems and/or databases 114.

As shown in FIG. 1, the product tracking and authentication system 102 (sometimes referred to as the "backend" or "backend platform") may comprise various mechanisms or applications 116 (e.g., in the form of software applications) and one or more databases 118, described in greater detail below. The mechanisms 116 may generally interact with the one or more databases 118.

The database(s) 118 may be or comprise multiple separate or integrated databases, at least some of which may be distributed. The database(s) 118 may be implemented in any manner, and, when made up of more than one database, the various databases need not all be implemented in the same manner. It should be appreciated that the system is not limited by the nature or location of database(s) 118 or by the manner in which they are implemented.

Each of the applications 116 is essentially a mechanism (as defined above, e.g., a software application) that may provide one or more services via an appropriate interface. Although shown as separate mechanisms for the sake of this description, it should be appreciated that some or all of the various mechanisms 116 may be combined. The various mechanisms 116 may be implemented in any manner and need not all be implemented in the same manner (e.g., with the same languages or interfaces or protocols).

The mechanisms 116 may include one or more of the following mechanisms:
1. configuration mechanism(s) 120
2. administrative mechanism(s) 122
3. tracking mechanism(s) 124
4. verification mechanism(s) 126
5. Intake mechanism(s) 128
6. Output mechanism(s) 130
7. Image recognition/processing mechanism(s) 132
8. Miscellaneous/auxiliary mechanisms 134

Note that the above list of mechanisms/mechanisms is exemplary and is not intended to limit the scope of the system 100 in any way. Those of ordinary skill in the art will appreciate and understand, upon reading this description, that the system 100 may include any other types of data processing mechanisms, image recognition mechanisms, and/or other types of mechanisms that may be necessary for the system 100 to generally perform its functionalities as described herein. In addition, as should be appreciated, embodiments or implementations of the system 100 need not include all of the mechanisms listed, and that some or all of the mechanisms may be optional.

The database(s) 118 may include one or more of the following database(s):
1. Product database(s) 136
2. Tag database(s) 138
3. Verification database(s) 140
4. User database(s) 142
5. Tracking database(s) 144
6. Miscellaneous and auxiliary database(s) 146

The above list of databases is exemplary and is not intended to limit the scope of the system 100 in any way.

The images database(s) 132 may include images of products and/or of product elements. The elements of a product may include any of the property's features or parts (e.g., a zipper, a shoe lace, etc.).

As shown in FIG. 1, the product tracking and authentication system 102 may access one or more external systems and databases 114. This access may include access via intake mechanism(s) 128 which may access external systems in order to obtain data therefrom. Access via output mechanism(s) 130 may be used to provide information (e.g., product tracking and/or authentication information) to the external systems and/or databases 114. Tracking mechanism(s) 124 and/or verification mechanism(s) 126 may evaluate data (e.g., obtained from external systems and databases 114 and/or in the database(s) 118) in order to determine information therefrom. The data evaluation mechanism(s) 126 may, e.g., include one or more mechanisms to determine consistency of product authentications, etc.

Various mechanisms in the tracking and authentication system 102 may be accessible via application interface(s) 148. These application interfaces 148 may be provided in the form of APIs or the like, made accessible to external users 104 via one or more gateways and interfaces 150. For example, the verification mechanism(s) 126 may provide APIs thereto (via application interface(s) 148), and the system 102 may provide external access to aspects of the verification mechanism(s) 126 (to users 104) via appropriate gateways and interfaces 150 (e.g., via a web-based mechanism and/or an mechanism running on a user's device).

Mechanisms and Data Structures

Details of various mechanisms, processes and functionalities of an exemplary tracking and authentication system 102 are now described.

The products rights holder(s) 108 may access the tracking and authentication system 102 to provide product information about their products. Such product information may include any information about a product including, when appropriate, pictures, ingredients, user manuals, etc. Some of the product information may be for internal use by the system 102, whereas some may be provided to users. Product information may be stored in the product database(s) 136.

The products rights holder(s) 108 may also access the tracking and authentication system 102 to provide and/or create tag information (e.g., unique identifiers for their products).

The product manufacturer(s)/distributor(s) 110 may access the tracking and authentication system 102 to associate tags (and thus tag information) provided by a products rights holder 108 with a particular product. In this manner, the tracking and authentication system 102 may form a mapping from unique identifiers to corresponding products (as shown, e.g., in FIG. 2). Such a mapping may be stored, e.g., in the tag database 138.

The system 100 preferably prevents a unique identifier from being used more than once (i.e., from being associated with more than one product). If the manufacturer somehow produces fake copies of tags, the identifier on those tags may not already be in the system (since the rights holder did not create them) or they will be duplicates. Thus, if a manufacturer tries to overproduce, the system 100 will not allow the overproduced items to be associated with tags. Those of skill in the art will understand, upon reading this description, that different and/or other security measures may be taken to prevent fraudulent use of tags by manufacturers and/or distributors.

Users 104 such as purchasers and the like may access the tracking and authentication system 102 to determine information about a particular item (product) that they have or wish to acquire. Using, e.g., an application (described below), a user may obtain an image of one or more of the tags associated with that particular item. The tracking and authentication system 102 may then decode information from that image to determine the unique identifier associated with the tag(s). That mapping from unique identifiers to corresponding products (described above) may then be used to obtain product information about the product that should be associated with the tag(s).

The user may then use that product information (e.g., images, textual descriptions, or the like) to ascertain the authenticity of the product.

Tags

As used herein, a tag may refer to any item that can be associated with and/or attached to a product. A tag may be, e.g., a hang tag or the like, or it may be integral with the product.

If more than one tag is used with a product, the tags may be of distinct kinds.

At least one tag associated with a product preferably includes at least some information that provides the product's unique product identifier.

A tag may be formed of any material(s) that allows indicia to be provided thereon. A tag may be formed of more than one material or substrate. A tag may be formed, e.g., of paper, cardboard, leather, plastic, metal, fabric, etc., or combinations thereof. A tag may also be presented on a video display.

As explained below, in preferred embodiments, at least some of the indicia on a tag is hidden, e.g., using steganography. As used herein, the term "hidden" means not readily or immediately visible to the human eye.

Those of skill in the art will understand, upon reading this description, that the scope hereof is not limited by the nature of the tags, the manner in which tags are associated with a product, or the manner in which information is encoded or stored or represented on a tag.

Steganography on Tags

In preferred embodiments, at least some of the indicia on a tag may be hidden, i.e., not readily or easily or immediately visible to the human eye.

Steganographic techniques may be used to incorporate indicia (e.g., unique product identifiers) in tags.

A tag may include visible indicia (e.g., a logo or the like) along with other visible information. In addition, a tag may include indicia (e.g., bar codes, QR codes, or the like) that is not readily visible to humans, but which may be discernable by image processing or the like.

Indicia may be associated with one or more parts of a tag, and different tags may have indicia located in different places.

An exemplary tag 300, as shown in FIG. 3, includes a substrate (or combination of substrates) having at least one printable region 302 (denoted by the dotted line in FIG. 3). A logo 304 and/or other images may be printed in the printable region 302 of the tag 300. In the drawing in FIG. 3 the logo is represented as a triangle. The printable region 302 may include other printed information and/or other decorative information. The logo 304 may take up substantially all of the printable region 302. The indicia may be associated with one or more of the indicia regions 306-1, 306-2, etc. (collectively indicia regions 306). One or more indicia regions 306 may overlap with the logo 304, in full or in part.

Although shown as rectangular in FIG. 3, a tag 300 may be of any arbitrary shape.

Preferably the indicia do not interfere with the visual design of the tag.

For any particular tag, one or more of the indicia regions 306 may be used to encode information, preferably hidden by some form of steganography.

In presently preferred implementations, redundant and/or error correcting information is included in the indicia, e.g., using Reed-Solomon encoding.

Presently preferred implementations of the steganography use color channel encoding.

In particular, a present implementation manipulates the intensity of yellow in an image to encode data. An exemplary technique is described in: http://classes.design.ucla.edu/Spring06/159/projects/tina/report.htm Embodiments may use steganography techniques taught in U.S. Pat. No. 8,451,264 to Fujitsu Limited, the entire contents of which are hereby fully incorporated herein by reference for all purposes.

Those of skill in the art will understand, upon reading this description, that different and/or other steganographic techniques may be used and are contemplated herein.

Producing Tags

As noted, a tag may be formed of various materials or substrates or combinations thereof. In this description, the process of producing a tag may include printing information on the tag. The term "print" (or "printing") refers to any form of applying an image or other information to a material or substrate.

Those of skill in the art will understand, upon reading this description, that the term "print" (or "printable" or "printing") may depend on the type of material or substrate used for the tag, and the term "printing" (or "print" or "printable") may differ for different substrates. Thus, as should be appreciated, images and indicia (e.g., hidden data) will be printed on a material or substrate using an appropriate technique for that material or substrate and an appropriate technique for the steganographic techniques in use.

Overview of Exemplary Operation

An overview of exemplary operation of a framework/system 100 is described here. Recall that the goals of a system 100 may include one or more of:
 providing for detecting counterfeit and/or unauthorized products;
 providing a chain of title or transfer of products; and
 providing information about products in a non-intrusive manner.

In operation, a particular product rights holder (e.g., a company in the U.S.A.) may wish to have a particular product (e.g., handbags) made (e.g., by a manufacturer in a factory in China). The particular product rights holder may authorize the manufacturer to make a certain number (e.g., 10,000) of the product.

The particular product rights holder wants to ensure that the products (in this case, the handbags) maintain their value by avoiding unauthorized overproduction and/or counterfeiting of the product.

To achieve this, at least in part, each authorized product is given a unique identifier (or serial number), and the unique identifier is associated with each particular product by one or more tags. Those of skill in the art will understand, upon reading this description, that product identifiers should be unique enough for a particular rights holder to prevent duplicates. Different degrees of uniqueness are acceptable and are contemplated herein. Preferably all of the product identifiers used by a particular system 102 are unique within that system.

Product Rights Holders

Figure 4A:
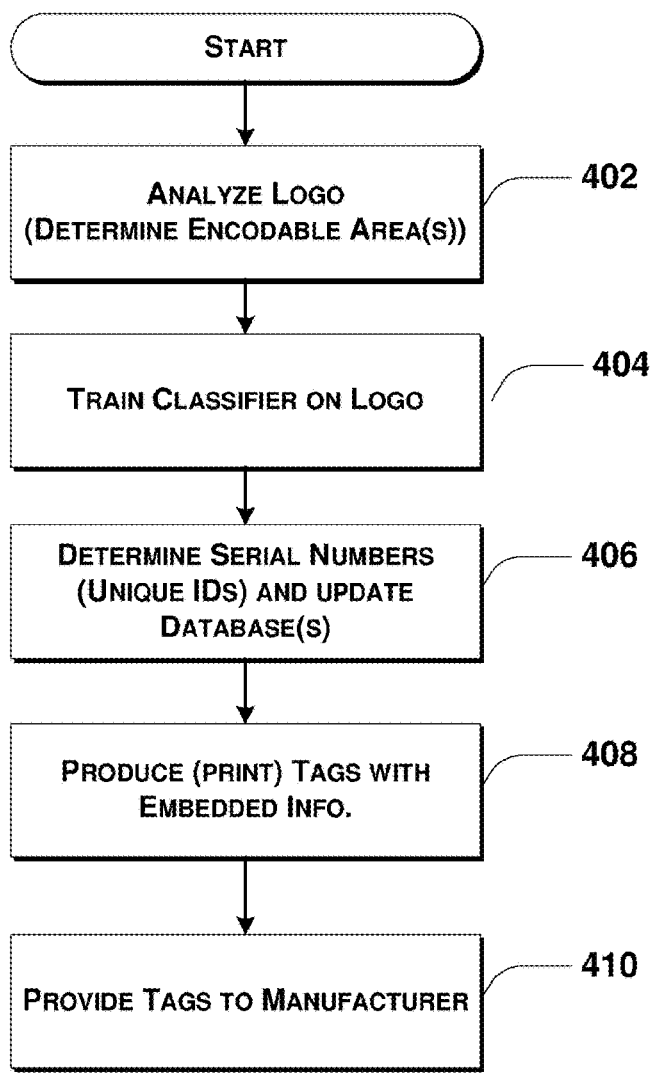
FIGS. 4A-4D are flowcharts showing aspects of a product authentication framework according to exemplary embodiments hereof.

A product rights holder may produce tags and provide them to a manufacturer, e.g., as shown in the flowchart in FIG. 4A.

The logo is analyzed (at 402) to determine encodable areas and a classifier is trained to recognize the logo (at 404).

The product rights holder (at 406) determines unique product identifiers (IDs) and updates the database(s) 118 (e.g., tag database(s) 138) to include these IDs. The product rights holder then (at 408) produces the tags with the embedded/encoded information, and provides the tags to one or more manufacturers (at 410).

The product rights holder may add information about the tags to the system 100. The product rights holder preferably maintains a record (e.g., in the tag database(s) 138) of which tags were provided to which manufactures.

When new products are to be made with the same tag design, then new serial numbers (product IDs) are determined (at 406), tags are printed (at 408), and the printed tags are provided to manufacturers (at 410).

The manufacturer may be provided with the tags for each product that they are authorized to make, with the unique product identifiers already encoded in some way in the tags.

Manufacturers

Figure 4B:
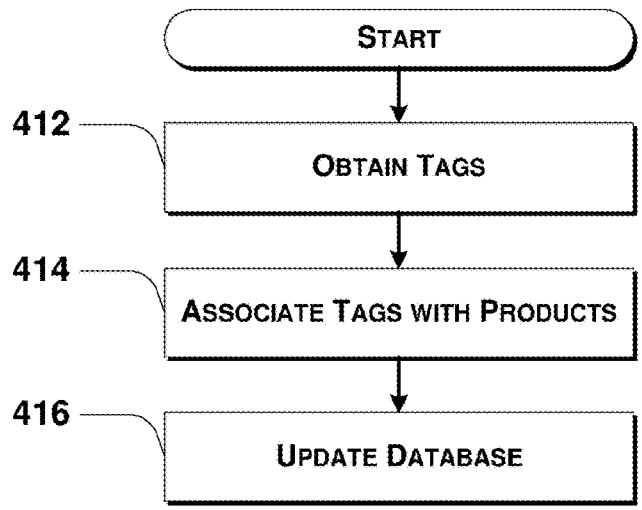

As noted, the manufacturer may be provided (at 410, FIG. 4A) with the tags for each product that they are authorized to make. With reference to the flowchart in FIG. 4B, a manufacturer obtains/receives the tags (at 412), and, as the products are made, the tags are associated with the products (at 414). As should be appreciated, the manner in which tags are associated with a product will depend on the type of product and/or tag. For example, a flexible plastic tag may be sewn into the inside of a product such as a shoe or a handbag or the like, whereas a cardboard hang tag may be attached to the product with a string or the like.

Once a particular product is made and a tag is associated with that particular item, the manufacturer may advise the system 100 (e.g., via a scan or the like) that the particular item/product is associated with a particular tag. In this manner, the database(s) 118, including the product database(s) 136 and tag database(s) 138 may be updated (at 416) to reflect the association between a particular tag (and thus a particular unique product identifier) and a particular product. This database update effectively updates the mapping (shown in FIG. 2) from unique identifiers to corresponding products.

User (Purchaser)

At a subsequent time, a user (e.g., a purchaser) may obtain information from the tag(s) associated with a product in order to confirm the provenance of that product.

A user may be provided with a software application (e.g., on their smartphone or other mobile computing device). Some processing may occur on the user's device, whereas other processing may occur on the tracking and authentication system 102.

Figure 4C:
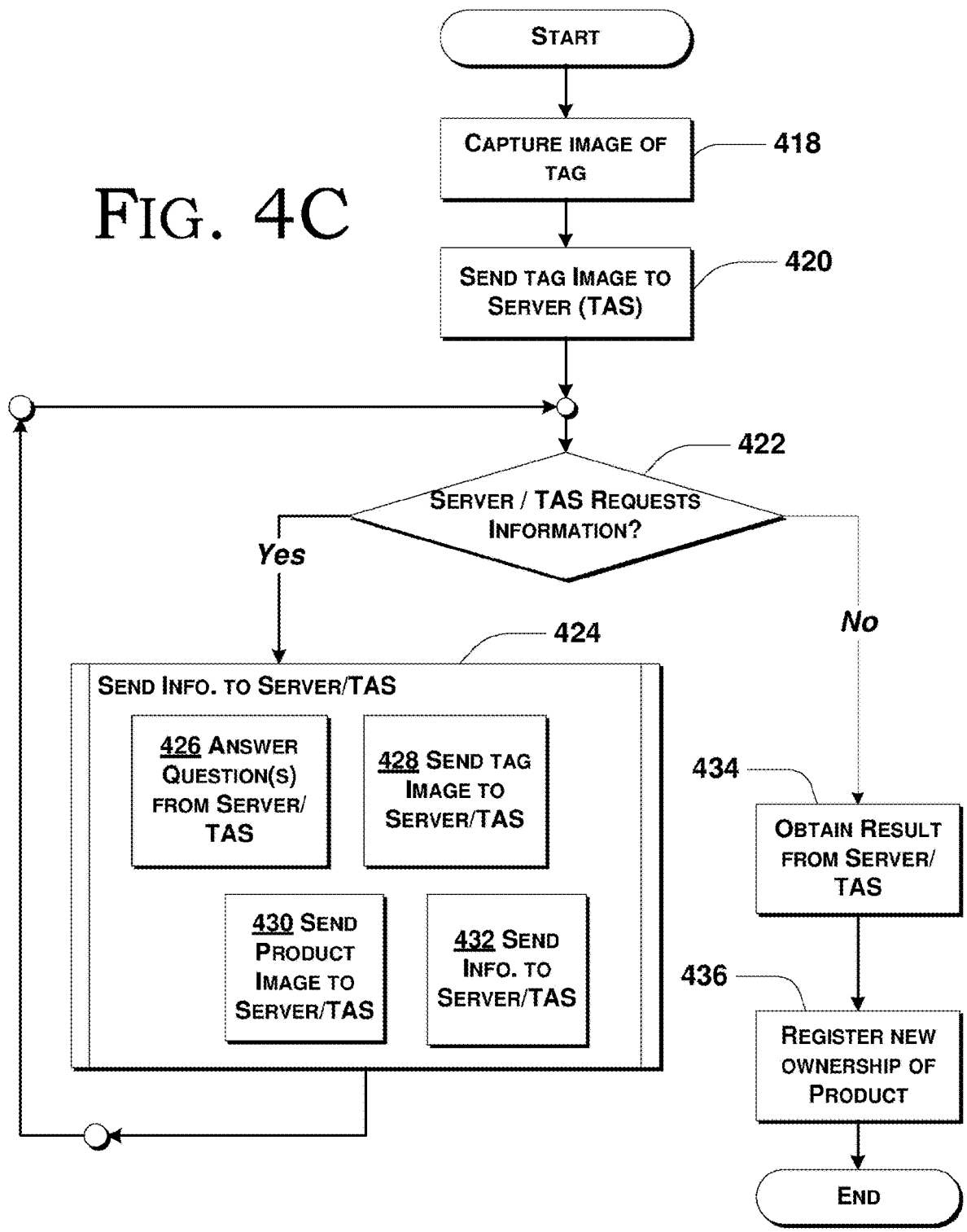
Figure 4D:
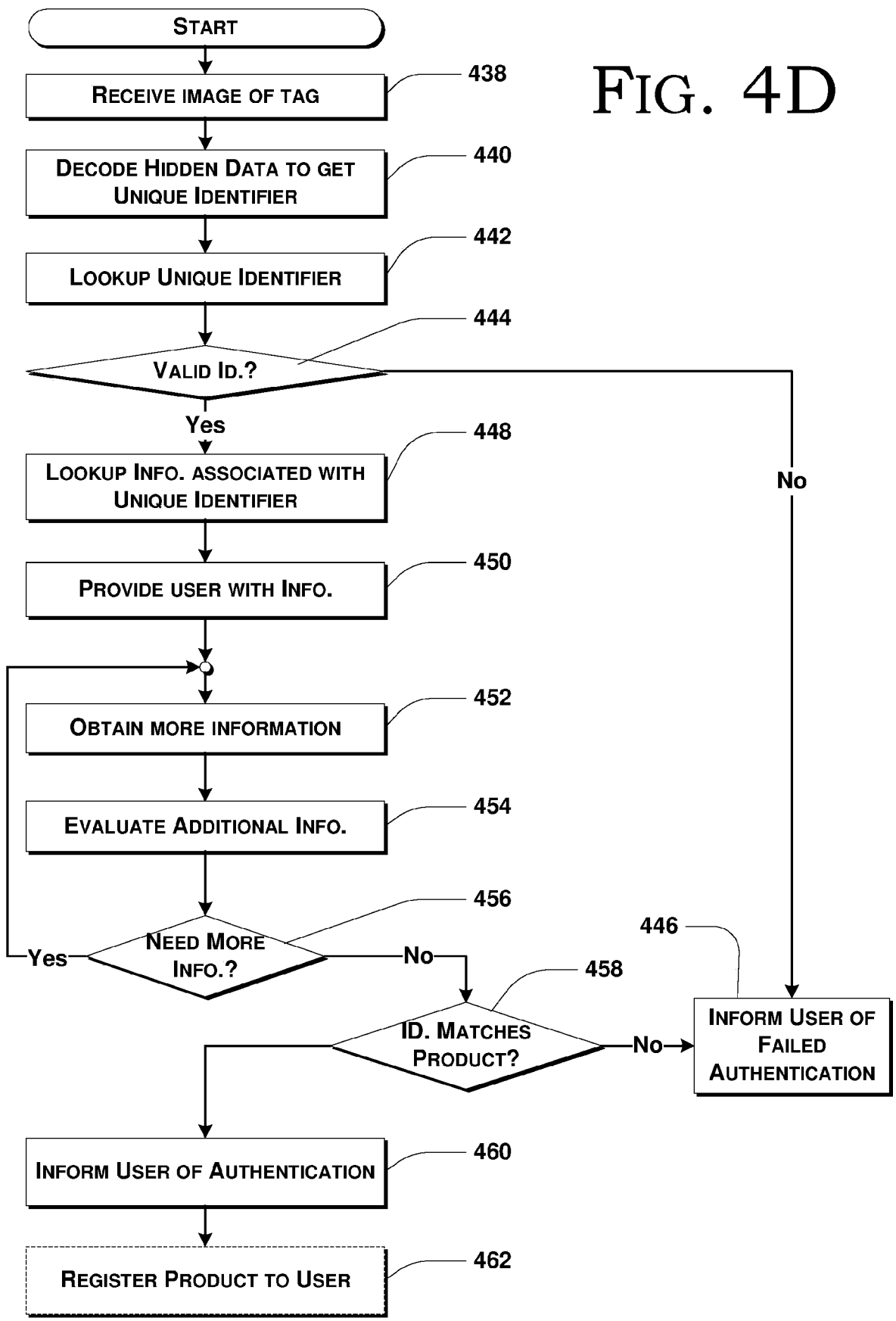
Figure 5:
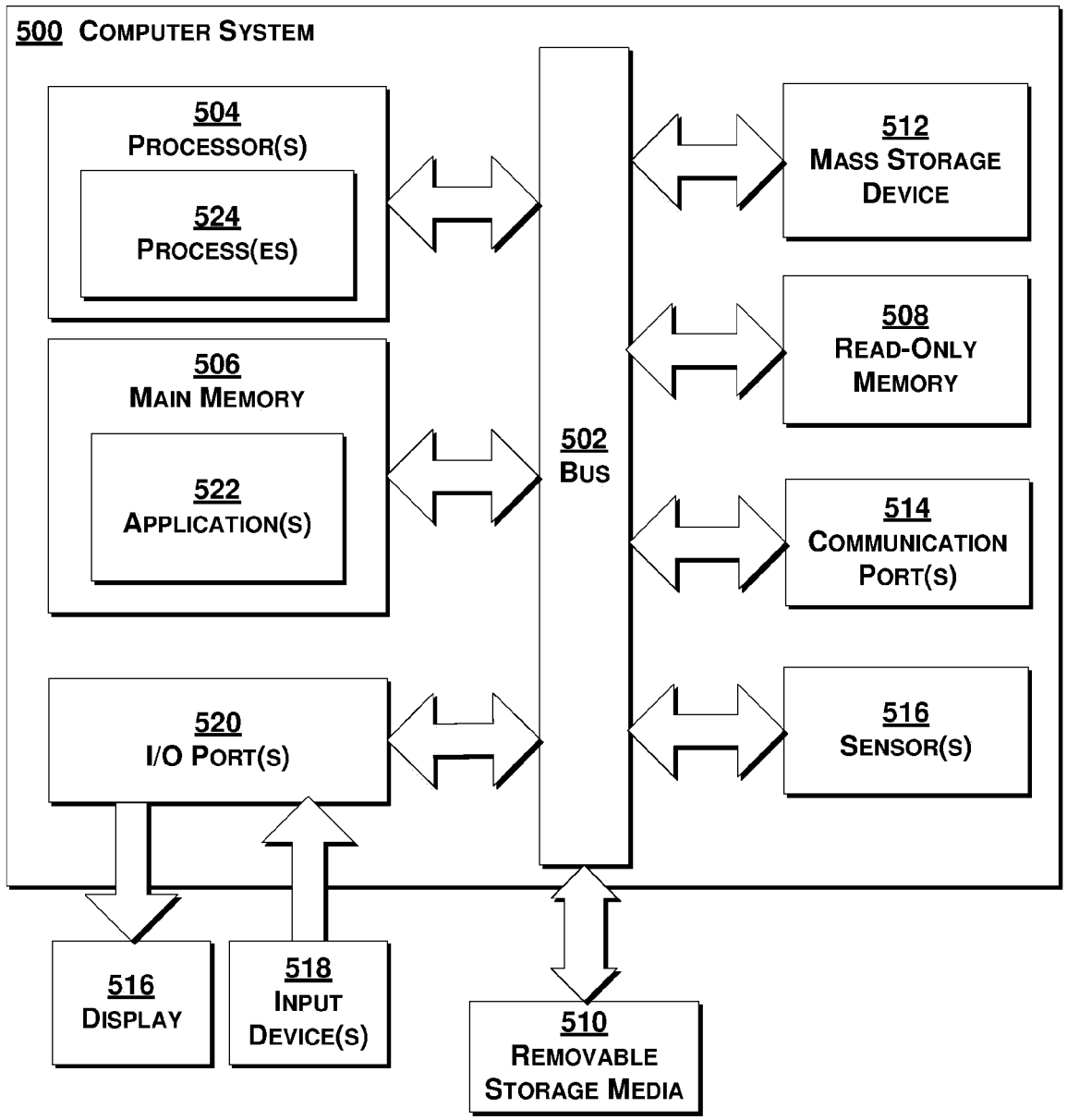
FIG. 5 depicts aspects of computing and computer devices in accordance with exemplary embodiments hereof.

The flowchart in FIG. 4C shows exemplary processing on the user/client side, and the flowchart in FIG. 4D shows exemplary processing on the tracking and authentication system 102. In the flowchart in FIG. 4C, the tracking and authentication system (TAS) 102 is also referred to as the "server."

With reference to the flowchart in FIG. 4C, a user wishing to determine information about a product (e.g., the products authenticity or provenance), may use a software application on their device along with the device's camera(s) to obtain an image (at 418) of a tag associated with the product. The tag may be, e.g., a hang tag, or the like. The application may then send (at 420) the image (preferably the raw image) to the tracking and authentication system 102 (e.g., via network 106 and gateway 150).

Processing by the tracking and authentication system 102 will be described below.

The tracking and authentication system 102 may (at 422) request additional information (e.g., if it is performing multi-factor verification). The user may then provide the additional information to the tracking and authentication system 102 (at 424).

If the tracking and authentication system 102 does require additional information, it may indicate this requirement on the display of the user's device. For example, the user may be asked questions about the product and/or the tag (at 426), the user may be asked to send an image of the tag and/or the product (or a part of the product) to the tracking and authentication system 102 (at 428, 430), and/or the user may be asked to send other information to the tracking and authentication system 102 (at 432).

For example, if the tracking and authentication system 102 determines that the tag should be associated with size 32 blue jeans of a particular design, the tracking and authentication system 102 may ask the user to enter the size and/or color of the jeans (at 426). Authentic versions of the product may have specific patterns thereon (e.g., an embroidered logo or the like) or may have specific hardware (e.g., a particular type of zipper or buttons). Thus, e.g., the tracking and authentication system 102 may ask the user to obtain an image of a part of the product (e.g., the jeans) containing the zipper and/or the logo.

As noted, some products may include multiple tags or have information encoded thereon in multiple places. For example, a shoe may have a plastic tag inside the shoe in addition to a hang tag on the outside of the shoe. The tracking and authentication system 102 may ask the user to provide an image of the additional tags or parts of the product (at 428, 430).

Some information requested by the tracking and authentication system 102 (e.g., at 432) may be determined automatically from the user's device (e.g., the user's location, as determined by GPS or the like).

The tracking and authentication system 102 may make multiple requests for additional information before making its determination.

Once the tracking and authentication system 102 requires no more information from the user, the tracking and authentication system 102 may provide a result (e.g., an authenticity rating or score) or other information to the user (at 434). The user may also be provided (at 436) with an option to register the product as theirs.

On the tracking and authentication system 102 side, the tracking and authentication system 102 (using, e.g., the verification mechanism(s) 126) receives (at 438) the image sent by the user (at 420 in FIG. 4C). The tracking and authentication system 102 (using, e.g., image recognition/processing mechanism(s) 132) then tries (at 440) to decode the hidden data in the image in order to get the unique identifier encoded therein.

The decoding (at 440) may require logo detection (e.g., using scale-invariant feature transformation—SIFT—point detection or the like) and may require normalizing the image. As is well known, SIFT may be to locate an object such as a logo in an image.

The tag database(s) 138 preferably include a mapping from logos (or the like) to tag configurations, so that once the logo is found in a tag image, the steganographically hidden data may be located and decoded.

The decoded data provides the unique identifier associated with the tag.

As a first or threshold action, the verification mechanism(s) 126 may ascertain whether the identifier is valid. If no identifier is found in the tag, or if the identifier is not valid (as determined at 444), then the user is notified (at 446) of a failed authentication. The system may provide additional information to the user (e.g., why the authentication failed), but preferably the user is only given minimal information (e.g., "pass" or "fail") so as to avoid giving users insight into how the tracking and authentication system 102 operates.

If the identifier is determined (at 444) to be valid, then the verification mechanism(s) 126 may (at 448) look up that identifier in the tag/product database(s) 136, 138 (e.g., using the mapping from unique identifiers to products (see FIG. 2) in order to determine information about the unique identifier and/or the product.

Some information (e.g., a picture of the product and other information) may be provided to the user (at 450).

The verification mechanism(s) 126 may require more information in order to evaluate the product. In a typical case, the verification mechanism(s) 126 may be unable to verify a product just from the tag. Accordingly, the verification mechanism(s) 126 may (at 452) request more information from the user. These requests are processed by the user as described above (with reference to FIG. 4C, at 422-432). The verification mechanism(s) 126 obtains and evaluates the additional information (at 454) and determines if still more information is needed (at 456) or whether the verification mechanism(s) 126 has sufficient information to make a verification determination.

When the verification mechanism(s) 126 has enough information to determine that the product is genuine or authentic, the verification mechanism(s) 126 may determine (at 458) if the identifier on the tag matches that of the product. As should be appreciated, a product may be genuine or authentic in the sense that it is properly made, but it may fail verification if, e.g., it was part of an unauthorized overproduction by an otherwise authorized manufacturer.

Thus, regardless of the verification mechanism(s) 126 determination on the product itself, if the identifier on the tag does not match that of the product (based on the mappings stored in the product and/or tag database(s) 136, 138, the verification will fail, and the user will be so informed (at 446).

If the verification mechanism(s) 126 determines that the product is genuine and the identifier on the tag(s) does match that of the product (as determined at 458), then the verification mechanism(s) 126 may inform the user (at 460) that the product is verified. The user may then be given an opportunity to register the product as theirs (at 462).

Images

As shown above, at various stages in the processing, the user needs to obtain images (e.g., of tags and/or parts of products). It may be preferable that images provided to the system 102 be of high enough resolution (e.g., 72 dpi), with adequate lighting, brightness, and contrast such that the represented element(s) within the image may be discernable.

Images may also be obtained from a video of the product. The system may have the ability to parse out images of the elements from video footage, to identify and capture particular frames of the video that may include the elements that may be desired, and to store these images to be processed by the application. For example, a system such as FFMPEG (available from ffmpeg.org) may be used to extract individual images from a video stream.

Images may be electronically time-stamped and geocoded.

Computing

The services, mechanisms, operations, and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

FIG. 15 is a schematic diagram of a computer system 500 upon which embodiments of the present disclosure may be implemented and carried out.

According to the present example, the computer system 500 includes a bus 502 (i.e., interconnect), one or more processors 504, a main memory 506, read-only memory (ROM) 508, removable storage media 510, and mass storage 512, and one or more communications ports 514. Communication port(s) 514 may be connected to one or more networks (not shown) whereby the computer system 500 may receive and/or transmit data.

As used herein, a "processor" means one or more microprocessors, central processing units (CPUs), graphics processing units (GPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like.

Communications port(s) 514 can be any of an RS-232 port for use with a modem-based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 may be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), USB drives, etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards, or protocols; and/or (iv) encrypted in any of a variety of ways well known in the art.

A computer-readable medium can store (in any appropriate format) those program elements that are appropriate to perform the methods.

As shown, main memory 506 is encoded with applications(s) 522 that support(s) the functionality as discussed herein (an application 522 may be a mechanism that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret, or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries(carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used in this description, the term "portion" means some or all. So, for example, "A portion of X" may include some of "X" or all of "X." In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs."

It should be appreciated that the words "first" and "second" in the description and claims are used to distinguish or identify, and not to show a serial or numerical limitation. Similarly, the use of letter or numerical labels (such as "(a)," "(b)," and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance," "such as," "for example" and the like, is merely intended to better illustrate the invention and does not indicate a limitation on the scope of the invention unless so claimed. Any steps or acts described in the specification may be performed in any order or simultaneously, unless the context clearly indicates otherwise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A computer-implemented product authentication method comprising:
   obtaining, with an image capture device associated with a mobile computing device, an image of a tag associated with a particular product, wherein said tag includes encoded information in at least one encodable area thereon, said encoded information including a unique serial number associated with the particular product, wherein at least some of said encoded information is encoded using steganography;
   the mobile computing device sending, via one or more electronic networks, the image to an authentication service;
   receiving, at the mobile computing device, and from the authentication service, via said one or more electronic networks, one or more requests for additional information, wherein the authentication service decoded the image to obtain a serial number; and,
   in response to said one or more requests from said authentication service, providing, via said one or more electronic networks, additional information to said authentication service, wherein the additional information comprises one or more of
   (a) at least one other image of said tag; and/or
   (b) at least one image of the particular product or of one or more portions of the particular product; and/or
   (c) a description of the particular product or of one or more portions of the particular product;
   and obtaining, via said one or more electronic networks, from said authentication service an indication of authenticity of said particular product, wherein said indication of authenticity was determined by said authentication service based on:
   (i) whether the tag is an authentic tag and the serial number encoded in said image is associated with a unique serial number for said particular product in a database maintained by said authentication service, the database comprising a plurality of distinct identifiers, each of said plurality of distinct identifiers being associated, in said database, with a corresponding plurality of products, and
   (ii) at least some of said additional information,
   wherein an authentic tag was produced by:
   (x) analyzing at least a part of the image to determine one or more encodable areas;
   (y) training a classifier to recognize the image; and
   (z) producing the authentic tag comprising the encoded information, including the unique serial number encoded in the one or more encodable areas.

2. The method of claim 1, wherein the additional information comprises one or more of:
   (d) a second image of a second tag associated with the particular product; and/or
   (e) location information.

3. The method of claim 2, wherein said second tag has a serial number encoded therein, and wherein said indication of authenticity is based on the serial number encoded in said image and at least the serial number encoded in the second tag.

4. The method of claim 3, wherein the serial number encoded in the second tag is distinct from the number on the tag.

5. The method of claim 2, wherein the second tag is integrated with the particular product.

6. The method of claim 2, wherein the tag is distinct from the particular product.

7. The method of claim 2, wherein the second tag comprises one or more substrates, and wherein a substrate of the second tag is selected from: paper, cardboard, leather, plastic, metal, and/or fabric.

8. The method of claim 1, further comprising:
registering new ownership of the particular product.

9. The method of claim 1, wherein the encoded information is in more than one encodable area on said tag.

10. The method of claim 1, wherein the image comprises a product logo.

11. The method of claim 1, wherein the image has an arbitrary shape.

12. The method of claim 1, wherein the tag is integrated with the particular product.

13. The method of claim 1, wherein the tag is distinct from the particular product.

14. The method of claim 1, wherein the tag comprises one or more substrates, and wherein a substrate of the tag is selected from: paper, cardboard, leather, plastic, metal, and/or fabric.

15. A computer-implemented method for product tracking and authentication, the method implemented on a computer system using hardware and software, the computer system having one or more processors and memory, the method comprising:
- (A) an authentication service on said computer system maintaining a database comprising a plurality of distinct identifiers, said plurality of distinct identifiers being associated, in said database, with a corresponding plurality of products, wherein each of said plurality of products has a corresponding unique identifier associated therewith;
- (B) receiving, at said authentication service, via one or more electronic networks, an image, said image including encoded information in at least one encodable area thereon, wherein at least some of said encoded information was encoded using steganography, wherein the image was acquired from a given product and/or a tag associated with the given product;
- (C) said authentication service determining a first identifier from said encoded information;
- (D) said authentication service determining whether said first identifier corresponds to an identifier in said database; and
- (E) based on said determining in (D), when it is determined by said authentication service that said first identifier corresponds to a particular identifier of said plurality of distinct identifiers in said database, said particular identifier being associated with a particular product in said database, said authentication service:
  - (E)(1) determining, from said database, product information associated with said particular product; and then
  - (E)(2) requesting additional information; and then
  - (E)(3) based on (i) whether the tag is an authentic tag and a number encoded in said image is equal to the identifier associated with said particular product in said database, and (ii) said additional information, providing, via said one or more electronic networks, an indication of authenticity of said product,
  wherein the additional information comprises one or more of
    - (a) at least one image of the product or of one or more portions of the product; and/or
    - (b) a description of the product or of one or more portions of the product, and
  wherein an authentic tag was produced by:
    - (x) analyzing at least a part of the image to determine one or more encodable areas;
    - (y) training a classifier to recognize the image; and
    - (z) producing the authentic tag comprising the encoded information, including the unique serial number encoded in the one or more encodable areas.

16. The method of claim 15, wherein the additional information comprises one or more of:
- (c) at least one other image of said tag; and/or
- (d) a second image of a second tag associated with the given product; and/or
- (e) location information.

17. The method of claim 16, wherein the second tag is integrated with the given product.

18. The method of claim 16, wherein the second tag comprises one or more substrates, and wherein a substrate of the second tag is selected from: paper, cardboard, leather, plastic, metal, and/or fabric.

19. The method of claim 16, wherein said image was received in (B) from a user, the method further comprising:
- (F) registering said given product with said user,
wherein said authentication service maintains at least one database associating a plurality of distinct products with corresponding users, and wherein said registering comprises said authentication service associating the given product with the user in said at least one database.

20. The method of claim 15, wherein the tag is integrated with the given product.

21. The method of claim 15, wherein the tag is distinct from the given product.

22. The method of claim 15, wherein the tag comprises one or more substrates, and wherein a substrate of the tag is selected from: paper, cardboard, leather, plastic, metal, and/or fabric.

23. The method of claim 15, wherein the encoded information is in more than one encodable area in said image.

24. The method of claim 15, wherein the image comprises a product logo.

25. The method of claim 15, wherein the image has an arbitrary shape.

26. A non-transitory computer-readable medium with one or more computer programs stored therein that, when executed by one or more processors, cause the one or more processors to perform at least the operations of: the method of claim 1.

27. A device comprising:
- (a) hardware, including memory and at least one processor, and
- (b) a service running on said hardware, wherein said service is configured to perform the method of claim 1.

28. A system comprising one or more devices according to claim 27.

* * * * *